(12) United States Patent
Bezryadin

(10) Patent No.: US 7,589,866 B2
(45) Date of Patent: *Sep. 15, 2009

(54) EDITING OF DIGITAL IMAGES, INCLUDING (BUT NOT LIMITED TO) COLOR-TO-MONOCHROMATIC CONVERSION AND CHANGING THE COLOR OF A MONOCHROMATIC IMAGE

(75) Inventor: Sergey N. Bezryadin, San Francisco, CA (US)

(73) Assignee: KWE International, Inc., South San Francisco, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/432,221

(22) Filed: May 10, 2006

(65) Prior Publication Data

US 2007/0146831 A1    Jun. 28, 2007

Related U.S. Application Data

(63) Continuation-in-part of application No. 11/321,443, filed on Dec. 28, 2005, now Pat. No. 7,489,420, and a continuation-in-part of application No. 11/322,111, filed on Dec. 28, 2005, now Pat. No. 7,495,800.

(51) Int. Cl.
*G06F 15/00*    (2006.01)
*G06K 1/00*     (2006.01)
*G03F 3/08*     (2006.01)
*G06T 17/00*    (2006.01)
*G09G 5/00*     (2006.01)
*H04N 1/60*     (2006.01)

(52) U.S. Cl. .................. 358/1.9; 358/518; 358/520; 345/428; 345/582

(58) Field of Classification Search ......... 358/1.9, 358/518, 504, 520, 530, 515, 443; 345/419, 345/428, 581
See application file for complete search history.

(56) References Cited

U.S. PATENT DOCUMENTS 5,285,297 A * 2/1994 Rose et al. .......... 358/518

(Continued)

FOREIGN PATENT DOCUMENTS

EP    0635971    1/1995
EP    1708480    10/2006

OTHER PUBLICATIONS

"HSV Color Space" Wikipedia, the free encyclopedia, http://en.wikipedia.org/wiki/HSB_color_space pp. 1-4.
"Color Conversion Algorithms" http://www.cs.rit.edu/~ncs/color/t_convert.html pp. 1-5.
Pascale, Danny "A Comparison Of Four Multimedia RGB Spaces" pp. 1-13.

(Continued)

*Primary Examiner*—Twyler L Haskins
*Assistant Examiner*—Jonathan R Beckley
(74) *Attorney, Agent, or Firm*—Haynes and Boone, LLP

(57) ABSTRACT

Color is edited using a color representation including digital values B (brightness), e and f such that $B=\sqrt{D^2+E^2+F^2}$, $e=E/B$, $f=F/B$, where DEF is a linear color coordinate system. Alternatively, color is represented using digital values B, C (chroma) and H (hue), where $\cos C=D/B$ and $\tan H=E/F$. Color-to-monochromatic image conversion, or changing the color of a monochromatic image, can be accomplished by setting e and f to constant values, and possibly (not necessarily) leaving B unchanged. Alternatively, the conversion can be accomplished by setting C and H to constant values. Other features are also provided.

22 Claims, 3 Drawing Sheets

U.S. PATENT DOCUMENTS

| | | | | |
|---|---|---|---|---|
| 5,434,683 | A | * | 7/1995 | Sekine et al. ............... 358/520 |
| 5,515,172 | A | * | 5/1996 | Shiau ......................... 358/520 |
| 6,239,886 | B1 | * | 5/2001 | Klassen et al. ............. 358/518 |
| 6,262,812 | B1 | * | 7/2001 | Chan et al. .................. 358/1.9 |
| 6,320,668 | B1 | * | 11/2001 | Kim ........................... 358/1.1 |
| 6,476,793 | B1 | * | 11/2002 | Motoyama et al. .......... 345/589 |
| 6,724,435 | B2 | * | 4/2004 | Segman ...................... 348/576 |
| 6,778,185 | B1 | | 8/2004 | Moroney |
| 6,867,883 | B1 | * | 3/2005 | Cholewo et al. ............ 358/1.9 |
| 7,046,400 | B2 | * | 5/2006 | Gindele et al. ............. 358/3.27 |
| 7,116,443 | B2 | * | 10/2006 | Handley et al. ............. 358/1.9 |
| 7,167,276 | B2 | * | 1/2007 | Wang et al. .................. 358/1.9 |
| 2003/0206307 | A1 | | 11/2003 | Handley et al. |
| 2004/0075852 | A1 | | 4/2004 | Wang et al. |
| 2005/0128499 | A1 | * | 6/2005 | Glickman ................... 358/1.9 |

OTHER PUBLICATIONS

Sharma, Gaurav; Vrhel, Michael J.; Trussell, H. Joel "Color Imaging for Multimedia" Proceedings of the IEEE, vol. 86, No. 6, Jun. 1998, pp. 1088-1108.

Worthey, James A. "Color Matching with Amplitude Not Left Out" pp. 1-6.

Farrell, Joyce E.; Cupitt, John; Saunders, David; Wandell, Brian A. "Estimating Spectral Reflectances of Digital Artwork" pp. 1-7.

Lee, John C. "Understanding Color" pp. 1-9.

"Basic sRGB Math—A Standard Default Color Space for the Internet—sRGB" http://www.srgb.com/basicsofsrgb.htm pp. 1-3.

Poynton, Charles "Color FAQ—Frequently Asked Question Color" http://www.poynton.com/notes/colour_and_gamma/ColorFAQ.html pp. 1-25.

Hoffmann, Gernot "Color Order Systems RGB, HLS, HSB" pp. 1-10.

Class ColorUtil http://livedocs.macromedia.com/flex/15/asdocs_en/mx/utils/ColorUtil.html p. 1-2.

MacAdam, "Orthogonal Color Matching Functions", Journal of the Optical Society of America, 1954, vol. 44, pp. 713-724.

Cohen, Jozef "Two Preferred Reference Frames in Fundamental Color Space" *Visual Color And Color Mixture: The Fundamental Color Space*, Huguette Cohen, 2001, pp. 94-95, 100-103.

International Search Report for International Application No. PCT/US06/62421, 3 pages.

Written Opinion for International Application No. PCT/US06/62421, 10 pages.

Supplementary European Search Report for EP Application No. 06 84 8818, Jun. 26, 2009, 7 pages.

\* cited by examiner

EDITING OF DIGITAL IMAGES, INCLUDING (BUT NOT LIMITED TO) COLOR-TO-MONOCHROMATIC CONVERSION AND CHANGING THE COLOR OF A MONOCHROMATIC IMAGE

CROSS REFERENCE TO RELATED APPLICATIONS

The present application is a continuation-in-part of U.S. patent application Ser. No. 11/321,443, filed Dec. 28, 2005 now U.S. Pat. No. 7,489,420 by Sergey N. Bezryadin, entitled "COLOR EDITING (INCLUDING BRIGHTNESS EDITING) USING COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES", incorporated herein by reference. The present present application is also a continuation-in-part of U.S. patent application Ser. No. 11/322,111, filed Dec. 28, 2005 now U.S. Pat. No. 7,495,800 by Sergey N. Bezryadin, entitled "COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES", incorporated herein by reference.

BACKGROUND OF THE INVENTION

The present invention relates to editing of color and monochromatic images. A digital representation of an image can be stored in a storage device (e.g. a computer memory, a digital video recorder, or some other device). Such representation can be transmitted over a network, and can be used to display the color image on a computer monitor, a television screen, a printer, or some other device. The image can be edited using a suitable computer program.

Color is a sensation caused by electromagnetic radiation (light) entering a human eye. The light causing the color sensation is called "color stimulus". Color depends on the radiant power and spectral composition of the color stimulus, but different stimuli can cause the same color sensation. Therefore, a large number of colors can be reproduced ("matched") by mixing just three "primary" color stimuli, e.g. a Red, a Blue and a Green. The primary stimuli can be produced by three "primary" light beams which, when mixed and reflected from an ideal diffuse surface, produce a desired color. The color can be represented by its coordinates, which specify the intensities of the primary light beams. For example, in linear RGB color coordinate systems, a color S is represented by coordinates R, G, B which define the intensities of the respective Red, Green and Blue primary light beams needed to match the color S. If $P(\lambda)$ is the radiance (i.e. the energy per unit of time per unit wavelength) of a light source generating the color S, then the RGB coordinates can be computed as:

$$R = \int_0^\infty P(\lambda)\bar{r}(\lambda)d\lambda$$
$$G = \int_0^\infty P(\lambda)\bar{g}(\lambda)d\lambda$$
$$B = \int_0^\infty P(\lambda)\bar{b}(\lambda)d\lambda$$
(1)

where $\bar{r}(\lambda)$, $\bar{g}(\lambda)$, $\bar{b}(\lambda)$ are "color matching functions" (CMF's). For each fixed wavelength $\lambda$, the values $\bar{r}(\lambda)$, $\bar{g}(\lambda)$, $\bar{b}(\lambda)$ are respectively the R, G and B values needed to match color produced by a monochromatic light of the wavelength $\lambda$ of a unit radiance. The color matching functions are zero outside of the visible range of the $\lambda$ values, so the integration limits in (1) can be replaced with the limits of the visible range. The integrals in (1) can be replaced with sums if the radiance $P(\lambda)$ is specified as power at discrete wavelengths. FIG. 1 illustrates the color matching functions for the 1931 CIE RGB color coordinate system for a 2° field. (CIE stands for "Commission Internationale de l'Eclairage".) See D. Malacara, "Color Vision and Colorimetry: theory and applications" (2002), and Wyszecki & Stiles, "Color Science: concepts and Methods, Quantitative Data and Formulae" ($2^{nd}$ Ed. 2000), both incorporated herein by reference.

The RGB system of FIG. 1 is called linear because, as shown by equations (1), the R, G, and B values are linear in $P(\lambda)$. In a linear system, the intensities such as R, G, B are called "tristimulus values".

As seen from FIG. 1, the function $\bar{r}(\lambda)$ can be negative, so the R coordinate can be negative. If R is negative, this means that when the color S is mixed with |R| units of the Red primary, the resulting color matches the mixture of G units of the Green primary with B units of the Blue primary.

New linear color coordinate systems can be obtained as non-degenerate linear transformations of other systems. For example, the 1931 CIE XYZ color coordinate system for a 2° field is obtained from the CIE RGB system of FIG. 1 using the following transformation:

$$\begin{bmatrix} X \\ Y \\ Z \end{bmatrix} = A_{RGB-XYZ} \begin{bmatrix} R \\ G \\ B \end{bmatrix}$$
(2)

where:

$$A_{RGB-XYZ} = \frac{1}{0.17697}\begin{bmatrix} 0.49 & 0.31 & 0.20 \\ 0.17697 & 0.81240 & 0.01063 \\ 0.00 & 0.01 & 0.99 \end{bmatrix}$$
(3)

This XYZ system does not correspond to real, physical primaries. The color matching functions $\bar{x}(\lambda)$, $\bar{y}(\lambda)$, $\bar{z}(\lambda)$ for this XYZ system are shown in FIG. 2. These color matching functions are defined by the same matrix $A_{RGB-XYZ}$:

$$\begin{bmatrix} \bar{x}(\lambda) \\ \bar{y}(\lambda) \\ \bar{z}(\lambda) \end{bmatrix} = A_{RGB-XYZ} \begin{bmatrix} \bar{r}(\lambda) \\ \bar{g}(\lambda) \\ \bar{b}(\lambda) \end{bmatrix}$$

The tristimulus values X, Y, Z can be computed from the color matching functions in the usual way:

$$X = \int_0^\infty P(\lambda)\bar{x}(\lambda)d\lambda$$
$$Y = \int_0^\infty P(\lambda)\bar{y}(\lambda)d\lambda$$
$$Z = \int_0^\infty P(\lambda)\bar{z}(\lambda)d\lambda$$
(4)

There are also non-linear color coordinate systems. One example is a non-linear sRGB system standardized by International Electrotechnical Commission (IEC) as IEC 61966-2-1. The sRGB coordinates can be converted to the XYZ coordinates (4) or the CIE RGB coordinates (1). Another example is HSB (Hue, Saturation, Brightness). The HSB system is based on sRGB. In the HSB system, the colors can be visualized as points of a vertical cylinder. The Hue coordinate is an angle on the cylinder's horizontal circular cross section. The pure Red color corresponds to Hue=0°; the pure Green to Hue=120°; the pure Blue to Hue=240°. The angles between 0° and 120° correspond to mixtures of the Red and the Green; the angles between 120° and 240° correspond to mixtures of the Green and the Blue; the angles between 240° and 360° correspond to mixtures of the Red and the Blue. The radial distance from the center indicates the color's Saturation, i.e. the amount of White (White means here that R=G=B). At the circumference, the Saturation is maximal, which means that the White amount is 0 (this means that at least one of the R, G, and B coordinates is 0). At the center, the Saturation is 0 because the center represents the White color (R=G=B). The Brightness is measured along the vertical axis of the cylinder, and is defined as max(R,G,B).

Different color coordinate systems are suitable for different purposes. For example, the sRGB system is convenient for rendering color on certain types of monitors which recognize the sRGB coordinates and automatically convert these coordinates into color. The HSB system is convenient for some color editing operations including brightness adjustments.

Brightness can be thought of as a degree of intensity of a color stimulus. Brightness corresponds to our sensation of an object being "bright" or "dim". Brightness has been represented as the Y value of the XYZ system of FIG. 2, or as the maximum of the R, G and B coordinates of the sRGB coordinate system. Other representations also exist. Hue is the attribute of a color perception denoted by blue, green yellow, red, purple, and so on. See the Wyszecki & Styles book cited above, page 487. Saturation can be thought of as a measure of the white amount in the color.

It is desirable to obtain color coordinate systems which facilitate transforming a color image into a monochromatic image (for example, in order to display a color image using a monochromatic printer or monitor, or to achieve a desired visual effect). It is also desirable to change the color of a monochromatic image.

SUMMARY

Some embodiments of the present invention provide color editing techniques using novel color coordinate systems and color editing apparatus and methods. In some embodiments, one of the coordinates is defined by a square root of a quadratic polynomial in tristimulus values, e.g. by a value B=$\sqrt{T_1^2+T_2^2+T_3^2}$ where $T_1$, $T_2$, $T_3$ are tristimulus values, or by the value B and the sign of one or more of $T_1$, $T_2$, $T_3$. In some embodiments, color-to-monochromatic conversion is facilitated. Also facilitated is changing the color of a monochromatic image.

In some embodiments, the color coordinate system has the following coordinates:

$$B=\sqrt{T_1^2+T_2^2+T_3^2}$$

$$S_2=T_2/B$$

$$S_3=T_3/B$$

In this coordinate system, if the B coordinate is changed, e.g. multiplied by some number k, and $S_2$ and $S_3$ are unchanged, the color modification corresponds to multiplying the tristimulus values by k. Such color modification does not change the chromaticity coordinates $$T_1/(T_1+T_2+T_3), T_2/(T_1+T_2+T_3), T_3/(T_1+T_2+T_3).$$

Therefore, B is a good representation of brightness, and $S_2$ and $S_3$ together provide a good representation of chromaticity. To convert a color image to a monochromatic image or to change the color of a monochromatic image, the coordinates $S_2$ and $S_3$ can be set to a predefined value representing the desired color (e.g. white for a black-and-white monochromatic image), and the value B can be left unchanged for each pixel. As a result, the brightness will be unchanged. Alternatively, the B coordinate can be processed to change the image brightness or contrast or achieve some other brightness-related effect.

Another embodiment uses a color coordinate system BCH in which the B coordinate is defined as above (e.g. by the value B=$\sqrt{T_1^2+T_2^2+T_3^2}$, or the value B and the sign of one or more of $T_1$, $T_2$, $T_3$). The other coordinates C and H are such that:

$$\cos C = T_1/B$$

$$\tan H = T_3/T_2$$

In some embodiments, B represents the brightness, C represents the chroma (saturation), and H represents the hue. A color-to-monochromatic image conversion, or changing the color of a monochromatic image, can be achieved by setting C and H to predefined values representing the desired color. The B coordinate can be unchanged, or can be changed as needed for brightness-related processing.

Linear transformations of such color coordinate systems can be used to obtain other color coordinate systems suitable for the color-to-monochromatic image conversion and changing the color of a monochromatic image.

The invention is not limited to the features and advantages described above. Other features are described below. The invention is defined by the appended claims.

DESCRIPTION OF SOME EMBODIMENTS

Figure 1:
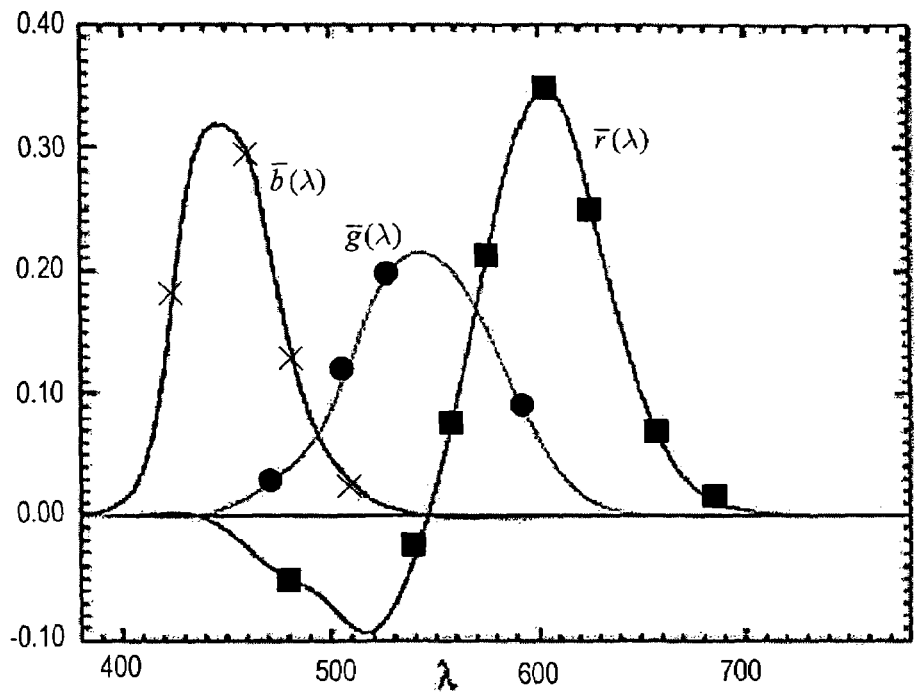
FIGS. 1 and 2 are graphs of color matching functions for prior art color coordinate systems.

The embodiments described in this section illustrate but do not limit the invention. The invention is defined by the appended claims.

Some embodiments of the present invention use color coordinate systems Bef and BCH which can be defined, for example, as follows. First, a linear color coordinate system DEF is defined as a linear transformation of the 1931 CIE XYZ color coordinate system of FIG. 2:

$$\begin{bmatrix} D \\ E \\ F \end{bmatrix} = A_{XYZ-DEF} \begin{bmatrix} X \\ Y \\ Z \end{bmatrix} \quad (5)$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \quad (6)$$

It has been found that for many computations, adequate results are achieved if the elements of matrix $A_{XYZ-DEF}$ are rounded to four digits or fewer after the decimal point, i.e. the matrix elements can be computed with an error $Err \leqq 0.00005$. Larger errors can also be tolerated in some embodiments. The DEF coordinate system corresponds to color matching functions $\bar{d}(\lambda), \bar{e}(\lambda), \bar{f}(\lambda)$ which can be obtained from $\bar{x}(\lambda), \bar{y}(\lambda), \bar{z}(\lambda)$ using the same matrix $A_{XYZ-DEF}$:

$$\begin{bmatrix} \bar{d}(\lambda) \\ \bar{e}(\lambda) \\ \bar{f}(\lambda) \end{bmatrix} = A_{XYZ-DEF} \begin{bmatrix} \bar{x}(\lambda) \\ \bar{y}(\lambda) \\ \bar{z}(\lambda) \end{bmatrix} \quad (7)$$

By definition of the color matching functions and the tristimulus values, $$D = \int_0^\infty P(\lambda) \bar{d}(\lambda) d\lambda \quad (8)$$
$$E = \int_0^\infty P(\lambda) \bar{e}(\lambda) d\lambda$$
$$F = \int_0^\infty P(\lambda) \bar{f}(\lambda) d\lambda$$

As explained above, the integration can be performed over the visible range only.

Figure 2:
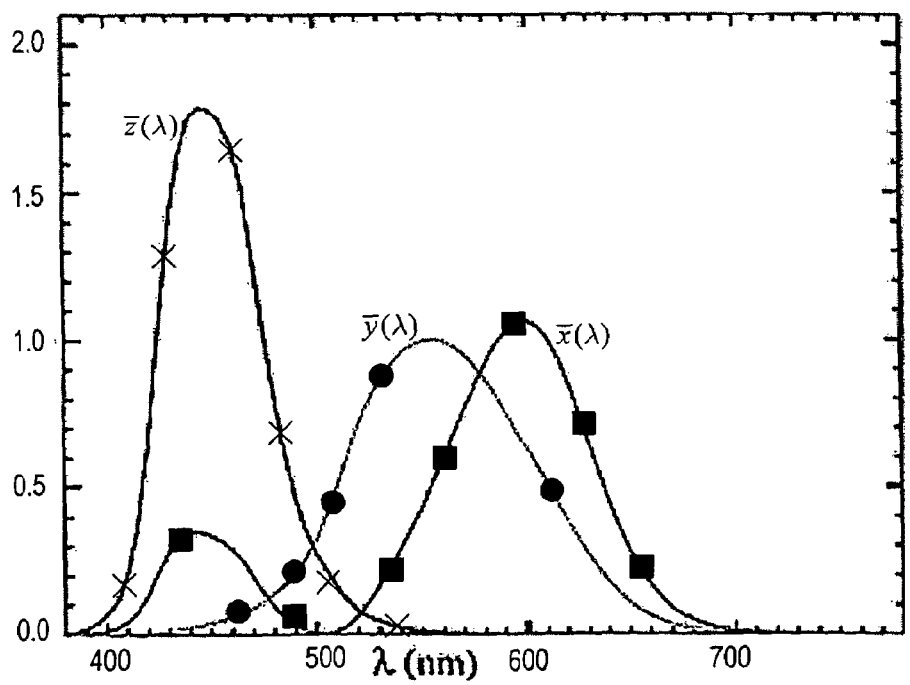

As seen in FIG. 2, the color matching functions $\bar{x}(\lambda), \bar{y}(\lambda), \bar{z}(\lambda)$ are never negative. It follows from equations (4) that the X, Y, Z values are never negative. Since the first row of matrix $A_{XYZ-DEF}$ has only positive coefficients, the function $\bar{d}(\lambda)$ is never negative, and the D value is also never negative.

When D>0 and E=F=0, the color is white or a shade of gray. Such colors coincide, up to a constant multiple, with the CIE $D_{65}$ white color standard.

If a color is produced by a monochromatic radiation with $\lambda=700$ nm (this is a red color), then F=0 and E>0.

The color matching functions $\bar{d}(\lambda), \bar{e}(\lambda), \bar{f}(\lambda)$ form an orthonormal system in the function space $L_2$ on $[0,\infty)$ (or on any interval containing the visible range of the $\lambda$ values if the color matching functions are zero outside of this range), that is:

$$\int_0^\infty \bar{d}(\lambda) \bar{e}(\lambda) d\lambda = \int_0^\infty \bar{d}(\lambda) \bar{f}(\lambda) d\lambda \quad (9)$$
$$= \int_0^\infty \bar{e}(\lambda) \bar{f}(\lambda) d\lambda$$
$$= 0$$

-continued $$\int_0^\infty [\bar{d}(\lambda)]^2 d\lambda = \int_0^\infty [\bar{e}(\lambda)]^2 d\lambda$$
$$= \int_0^\infty [\bar{f}(\lambda)]^2 d\lambda$$
$$= K$$

where K is a positive constant defined by the measurement units for the wavelength $\lambda$ and the radiance $P(\lambda)$. The units can be chosen so that K=1.

The integrals in (9) can be replaced with sums if the CMF's are defined at discrete $\lambda$ values, i.e.:

$$\sum_\lambda \bar{d}(\lambda) \bar{e}(\lambda) = \sum_\lambda \bar{d}(\lambda) \bar{f}(\lambda) \quad (10)$$
$$= \sum_\lambda \bar{e}(\lambda) \bar{f}(\lambda)$$
$$= 0$$

$$\sum_\lambda [\bar{d}(\lambda)]^2 = \sum_\lambda [\bar{e}(\lambda)]^2$$
$$= \sum_\lambda [\bar{f}(\lambda)]^2$$
$$= K$$

where the sums are taken over a discrete set of the $\lambda$ values. The constant K can be different than in (9). Color matching functions will be called orthonormal herein if the satisfy the equations (9) or (10).

If S1 and S2 are two colors with DEF coordinates (D1,E1,F1) and (D2,E2,F2), a dot product of these colors can be defined as follows:

$$<S1,S2> = D1*D2 + E1*E2 + F1*F2 \quad (11)$$

Figure 3:
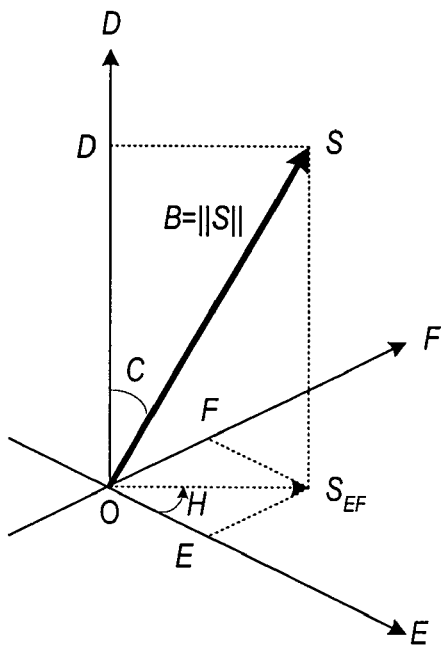
FIG. 3 illustrates some color coordinate systems according to some embodiments of the present invention.

Thus, the DEF coordinate system can be thought of as a Cartesian coordinate system having mutually orthogonal axes D, E, F (FIG. 3), with the same measurement unit for each of these axes.

The dot product (11) does not depend on the color coordinate system as long as the color coordinate system is orthonormal in the sense of equations (9) or (10) and its CMF's are linear combinations of $\bar{x}(\lambda), \bar{y}(\lambda), \bar{z}(\lambda)$ (and hence of $\bar{d}(\lambda), \bar{e}(\lambda), \bar{f}(\lambda)$). More particularly, let $T_1, T_2, T_3$ be tristimulus values in a color coordinate system whose CMF's $\bar{t}_1, \bar{t}_2, \bar{t}_3$ belong to a linear span $\text{Span}(\bar{d}(\lambda), \bar{e}(\lambda), \bar{f}(\lambda))$ and satisfy the conditions (9) or (10). For the case of equations (9), this means that:

$$\int_0^\infty \bar{t}_1(\lambda) \bar{t}_2(\lambda) d\lambda = \int_0^\infty \bar{t}_1(\lambda) \bar{t}_3(\lambda) d\lambda \quad (12)$$
$$= \int_0^\infty \bar{t}_2(\lambda) \bar{t}_3(\lambda) d\lambda$$
$$= 0$$

-continued $$\int_0^\infty [\overline{t_1}(\lambda)]^2 d\lambda = \int_0^\infty [\overline{t_2}(\lambda)]^2 d\lambda$$
$$= \int_0^\infty [\overline{t_3}(\lambda)]^2 d\lambda$$
$$= K$$

with the same constant K as in (9). The discrete case (10) is similar. Suppose the colors S1, S2 have the $T_1 T_2 T_3$ coordinates $(T_{1,1}, T_{2,1}, T_{3,1})$ and $(T_{1,2}, T_{2,2}, T_{3,2})$ respectively. Then the dot product (11) is the same as $$<S_1,S_2>=T_{1,1}T_{1,2}+T_{2,1}T^{2,2}+T_{3,1}T_{3,2}.$$

The brightness B of a color S can be represented as the length (the norm) of the vector S:

$$B=\|S\|=\sqrt{<S,S>}=\sqrt{D^2+E^2+F^2} \quad (13)$$

The Bef color coordinate system is defined as follows:

$$B=\sqrt{D^2+E^2+F^2}$$

$$e=E/B$$

$$f=F/B \quad (14)$$

If B=0 (absolute black color), then e and f can be left undefined or can be defined in any way, e.g. as zeroes.

Since D is never negative, the D, E, F values can be determined from the B, e, f values as follows:

$$E=e \times B$$

$$F=f \times B$$

$$D=\sqrt{B^2-(e^*B)^2-(f^*B)^2}=B\sqrt{1-e^2-f^2} \quad (15)$$

The Bef system is convenient for brightness editing because the brightness can be changed by changing the B coordinate and leaving e and f unchanged. Thus, if it is desired to change from some value B to a value k×B for some factor k, the new Bef color coordinates B*,e*,f* can be computed as:

$$B^*=k \times B$$

$$e^*=e$$

$$f^*=f \quad (16)$$

Here k>1 if the brightness is to be increased, and k<1 if the brightness is to be decreased. The transformation (16) corresponds to multiplying the D, E and F values by k:

$$D^*=k \times D$$

$$E^*=k \times E$$

$$F^*=k \times F \quad (17)$$

This transformation in turn corresponds to multiplying the color's radiance P(λ) by k (see equations (4)). The radiance multiplication by k is a good model for the intuitive understanding of brightness as a measure of the intensity of the color stimulus. Also, there is no color shift in the transformation (16), i.e. the color's chromatic perception does not change.

Figure 4:
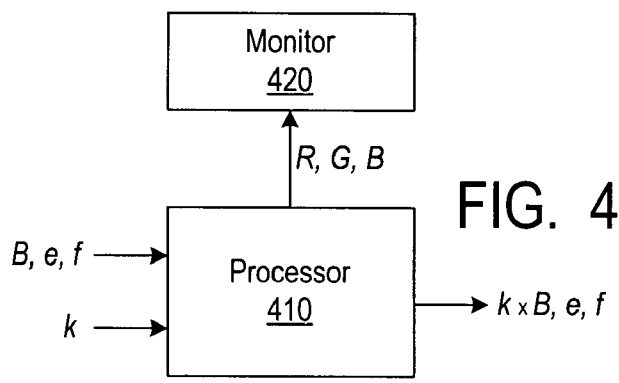
FIGS. 4 and 5 are block diagrams illustrating color editing according to some embodiments of the present invention.

The brightness can be changed over the whole image or over a portion of the image as desired. The brightness transformation can be performed using computer equipment known in the art. For example, in FIG. 4, a computer processor 410 receives the color coordinates B, e, f (from a memory, a network, or some other source) and also receives the factor k (which can be defined by a user via some input device, e.g. a keyboard or a mouse). The processor outputs the k×B, e, f coordinates. In some embodiments, this color editing is controlled by a user who watches the color on a monitor 420 before and after editing. To display the color on monitor 420, the processor 410 may have to convert the color from the Bef coordinate system to some other coordinate system suitable for the monitor 420, e.g. sRGB or some other system as defined by the monitor specification. The color conversion can be performed by converting the color between Bef and DEF as specified by equations (14) and (15), and between DEF and the XYZ system of FIG. 2 by equations (5) and (6). The color conversion between the XYZ coordinate system and the sRGB can be performed using known techniques.

Another color coordinate system that facilitates the brightness editing is the spherical coordinate system for the DEF space. This coordinate system BCH (Brightness, Chroma, Hue) is defined as follows (see also FIG. 3):

$$B=\sqrt{D^2+E^2+F^2} \quad (18)$$

C ("chroma") is the angle between the color S and the D axis;

H ("hue") is the angle between (i) the orthogonal projection $S_{EF}$ of the vector S on the EF plane and (ii) the E axis.

The term "chroma" has been used to represent a degree of saturation (see Malacara's book cited above). Recall that in the HSB system, the Saturation coordinate of a color represents the white amount in the color. In the BCH system, the C coordinate of a color is a good representation of saturation (and hence of chroma) because the C coordinate represents how much the color deviates from the white color $D_{65}$ represented by the D axis (E=F=0).

The H coordinate of the BCH system represents the angle between the projection $S_{EF}$ and the red color represented by the E axis, and thus the H coordinate is a good representation of hue.

Transformation from BCH to DEF can be performed as follows:

$$D=B \times \cos C$$

$$E=B \times \sin C \times \cos H$$

$$F=B \times \sin C \times \sin H \quad (19)$$

Transformation from DEF to BCH can be performed as follows. The B coordinate can be computed as in (18). The C and H computations depend on the range of these angles. Any suitable ranges can be chosen. In some embodiments, the angle C is in the range [0,π/2], and hence $$C=\cos^{-1}(D/B) \quad (20)$$

In some embodiments, the angle H can be computed from the relationship:

$$\tan H=F/E \quad (21A)$$

or $$\tan H=f/e \quad (21B)$$

where e and f are the Bef coordinates (14). For example, any of the following relations can be used:

$$H = \tan^{-1}(F/E) + \alpha$$

$$H = \tan^{-1}(f/e) + \alpha \tag{22}$$

where $\alpha$ depends on the range of H. In some embodiments, the angle H is measured from the positive direction of the E axis, and is in the range from 0 to $2\pi$ or $-\pi$ to $\pi$. In some embodiments, one of the following computations is used:

$$H = arctg(E,F)$$

$$H = arctg(e,f) \tag{23}$$

where arctg is computed as shown in pseudocode in Appendix 1 at the end of this section before the claims.

Transformation from BCH to Bef can be performed as follows:

$$B = B$$

$$e = \sin C \times \cos H$$

$$f = \sin C \times \sin H \tag{24}$$

Transformation from Bef to BCH can be performed as follows:

$$B = B$$

$$C = \cos^{-1}\sqrt{1 - e^2 - f^2}, \text{ or } C = \sin^{-1}\sqrt{e^2 + f^2}$$

$$H = \tan^{-1}(f/e) + \alpha \text{ (see (22))}, \text{ or } H = arctg(e,f) \text{ (see Appendix 1).} \tag{25}$$

Figure 5:
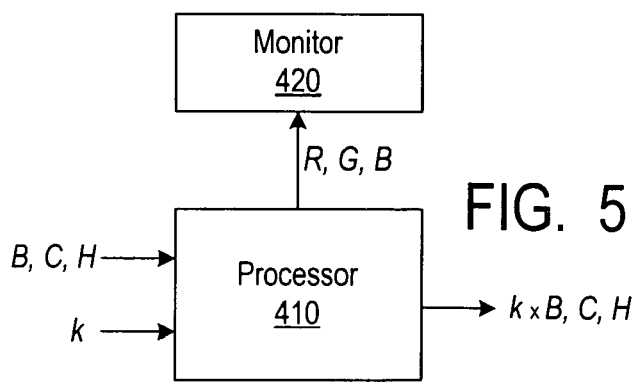

As with Bef, the BCH system has the property that a change in the B coordinate without changing C and H corresponds to multiplying the tristimulus values D, E, F by some constant k (see equations (17)). The brightness editing is therefore simple to perform. In FIG. 5, the brightness editing is performed like in FIG. 4, with the C and H coordinates used instead of e and f.

Figure 6:
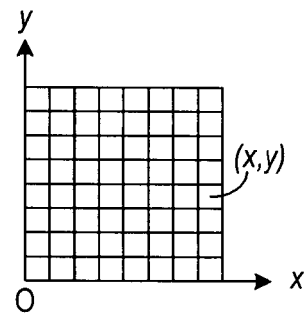
FIG. 6 illustrates an image edited according to some embodiments of the present invention.

The Bef and BCH systems are also suitable for contrast editing. In some embodiments, the contrast is enhanced by increasing the brightness level at the image portions that are brighter than some average value $B_{avg}$, and decreasing the brightness at the image portions that are dimmer than the average value. For the sake of illustration, suppose the image consists of a two-dimensional set of pixels with coordinates (x,y), as shown in FIG. 6. In some embodiments, the average value is the mean of the brightness values over the image:

$$B_{avg} = \frac{1}{N} \sum_{x,y} B_{x,y} \tag{26}$$

where N is the number of the pixels in a region containing the pixel (x,y). In some embodiments, the region is a square, a rectangle, a circle, or an ellipse, and the pixel (x,y) is at the region's center. In some embodiments, the regions have the same size for different pixels, except possibly at the image boundary. In some embodiments, the radius of a circular region, or one half of each axis of an elliptical region, or one half of each side of a rectangular region, are each greater than five pixels except perhaps at the image boundary. In the Bef system, for each pixel (x,y), the new coordinates $B_{x,y}^*$, $e_{x,y}^*$, $f_{x,y}^*$ for the contrast adjustment are computed from the original coordinates $B_{x,y}$, $e_{x,y}$, $f_{x,y}$ as follows:

$$B_{x,y}^* = B_{avg}^{1-\epsilon} \times B_{x,y}^{\epsilon}$$

$$e_{x,y}^* = e_{x,y}$$

$$f_{x,y}^* = f_{x,y} \tag{27}$$

Here, $\epsilon$ is some positive constant. Of note, the equations (27) imply that:

$$\frac{B_{x,y}^*}{B_{avg}} = \left(\frac{B_{x,y}}{B_{avg}}\right)^{\epsilon} \tag{28}$$

Thus, if $\epsilon > 1$, then the contrast is increased because the brightness range is increased over the image. If $\epsilon < 1$, the contrast is decreased.

The contrast adjustment can be performed over pixels (x,y) of a portion of the image rather than the entire image.

Similarly, in the BCH system, the B coordinate is computed as in (27), and the C and H coordinates are unchanged:

$$B_{x,y}^* = B_{avg}^{1-\epsilon} \times B_{x,y}^{\epsilon}$$

$$C_{x,y}^* = C_{x,y}$$

$$H_{x,y}^* = H_{x,y} \tag{29}$$

In some embodiments, the transformations (27), (29) are also used to sharpen or blur the image or an image portion. The average value $B_{avg}$ is computed over a small region containing the pixel (x,y). In some embodiments, the radius of a circular region, or one half of each axis of an elliptical region, or one half of each side of a rectangular region, are each five pixels or less except perhaps at the image boundary.

In some embodiments, the Bef and BCH systems are used to adjust a shadow portion or a highlight portion of the image (e.g. to deepen the shadow and/or brighten (highlight) a brighter image portion). As in equations (27), (29), the e and f coordinates or the C and H coordinates are unchanged. The brightness is modified as follows:

$$B_{x,y}^* = B_{x,y} \times (B_0/B_{avg})^{\epsilon} \tag{30}$$

where:

$B_0$ is some pre-defined brightness level, e.g. the maximum brightness over the image;

$B_{avg}$ is the mean brightness over a region containing the pixel (x,y);

$\epsilon$ is a pre-defined constant; $\epsilon$ is in the interval (0,1) if it is desired to increase the brightness range near the pixel (x,y), and thus to sharpen the image near the pixel (good results can be achieved with $\epsilon \leq \frac{1}{2}$); $\epsilon$ is negative (e.g. in the interval (−1,0)) if it is desired to reduce the sharpness range to blur the image.

Figure 7:
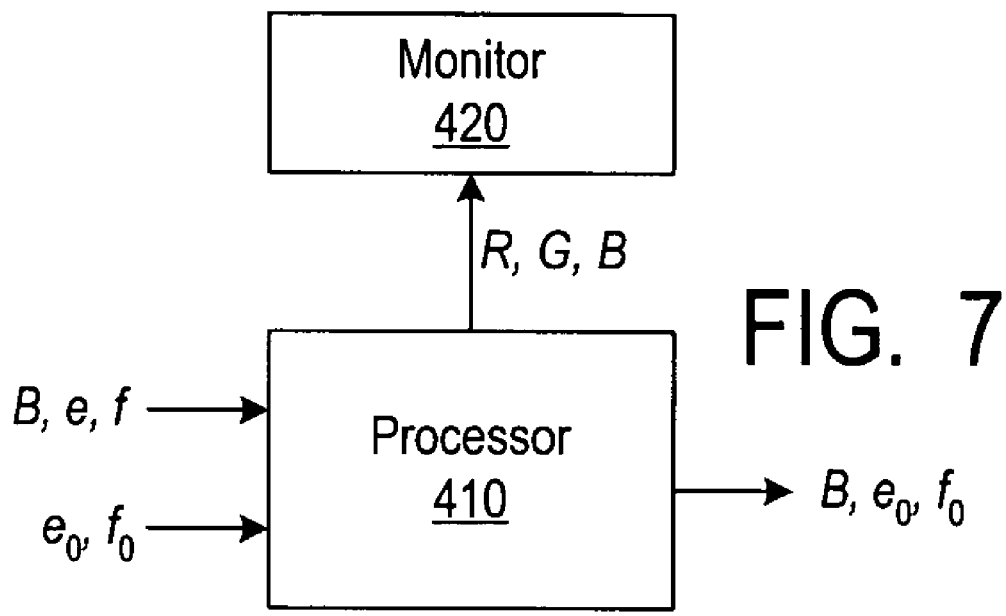
FIGS. 7 and 8 are block diagrams illustrating color editing according to some embodiments of the present invention.

The Bef and BCH systems are also convenient for converting a color image to a monochromatic image, or for changing the color of a monochromatic image. In these transformations, the brightness B can be unchanged. The transformation is performed in the Bef system by setting the e and f coordinates to some constant values $e_0$ and $f_0$, as shown in FIG. 7. More particularly, computer processor 410 receives the color coordinates B, e, f and also receives the values $e_0, f_0$. The processor outputs the coordinates B, $e_0, f_0$ for each pixel:

$$B^* = B$$

$$e^* = e_0$$

$$f^* = f_0 \tag{31}$$

Figure 8:
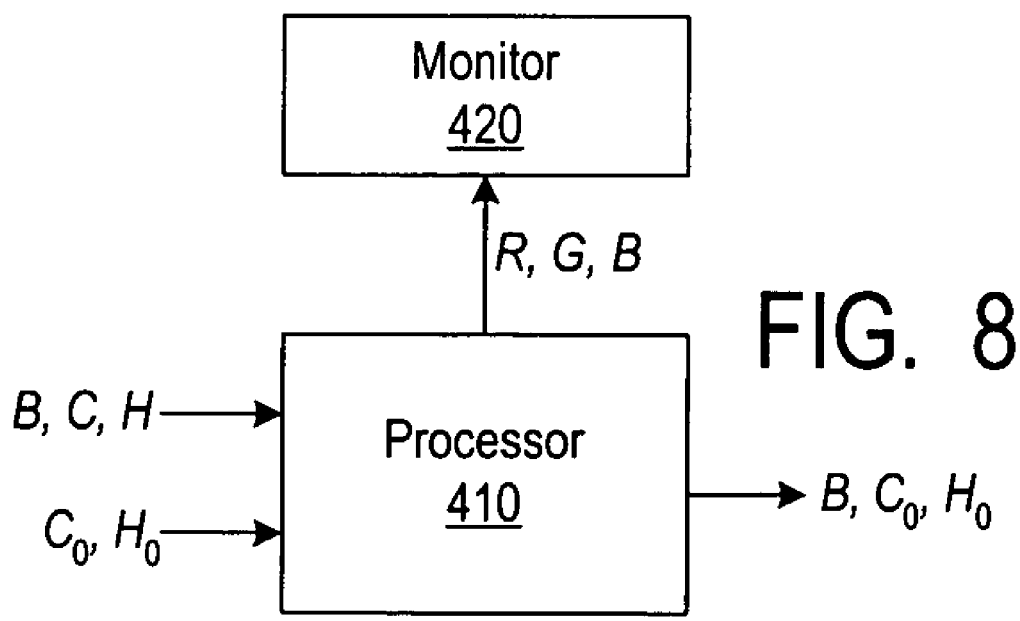

In the BCH system, the monochromatic transformation is given by the following equations:

$$B^* = B$$

$$C^* = C_0$$

$$H^* = H_0 \tag{32}$$

where $C_0$, $H_0$ are some input values corresponding to the desired color. Computer processor 410 (FIG. 8) receives the color coordinates B, C, H and also receives the values $C_0$, $H_0$. The processor outputs the coordinates B, $C_0$, $H_0$ for each pixel according to (32).

In some embodiments, the transformation (31) or (32) can be combined with some brightness editing. For example, in at least a portion of the image, the output brightness B* can be computed as in (16) for some input value k, or as in (26) or (28). Other brightness editing types are also possible. See e.g. U.S. patent application Ser. No. 11/377,161, entitled "EDITING (INCLUDING CONTRAST AND SHARPNESS EDITING) OF DIGITAL IMAGES", filed on Mar. 16, 2006 by Sergey N. Bezryadin and incorporated herein by reference.

The invention includes systems and methods for color image editing and display. The Bef and BCH color coordinates can be transmitted in a data carrier such as a wireless or wired network link, a computer readable disk, or other types of computer readable media. The invention includes computer instructions that program a computer system to perform the brightness editing and color coordinate system conversions. Some embodiments of the invention use hardwired circuitry instead of, or together with, software programmable circuitry.

In some embodiments, the Bef or BCH color coordinate system can be replaced with their linear transforms, e.g. the coordinates (B+e,e,f) or (2B,2e,2f) can be used instead of (B,e,f). The angle H can be measured from the E axis or some other position. The angle C can also be measured from some other position. The invention is not limited to the order of the coordinates. The invention is not limited to DEF, XYZ, or any other color coordinate system as the initial coordinate system. In some embodiments, the orthonormality conditions (9) or (10) are replaced with quasi-orthonormality conditions, i.e. the equations (9) or (10) hold only approximately. More particularly, CMF's $\overline{t_1}(\lambda), \overline{t_2}(\lambda), \overline{t_3}(\lambda)$ will be called herein quasi-orthonormal with an error at most $\epsilon$ if they satisfy the following conditions:

1. each of $$\int_0^\infty \overline{t_1}(\lambda)\overline{t_2}(\lambda)d\lambda, \int_0^\infty \overline{t_1}(\lambda)\overline{t_3}(\lambda)d\lambda, \int_0^\infty \overline{t_2}(\lambda)\overline{t_3}(\lambda)d\lambda$$

is in the interval $[-\epsilon, \epsilon]$, and 2. each of $$\int_0^\infty [\overline{t_1}(\lambda)]^2 d\lambda, \int_0^\infty [\overline{t_2}(\lambda)]^2 d\lambda, \int_0^\infty [\overline{t_3}(\lambda)]^2 d\lambda$$

is in the interval $[K-\epsilon, K+\epsilon]$ for positive constants K and $\epsilon$. In some embodiments, $\epsilon$ is 0.3K, or 0.1K, or some other value at most 0.3K, or some other value. Alternatively, the CMF's will be called quasi-orthonormal with an error at most $\epsilon$ if they satisfy the following conditions:

1. each of $$\sum_\lambda \overline{t_1}(\lambda)\overline{t_2}(\lambda), \sum_\lambda \overline{t_1}(\lambda)\overline{t_3}(\lambda), \sum_\lambda \overline{t_2}(\lambda)\overline{t_3}(\lambda)$$

is in the interval $[-\epsilon, \epsilon]$, and 2. each of $$\sum_\lambda [\overline{t_1}(\lambda)]^2, \sum_\lambda [\overline{t_2}(\lambda)]^2, \sum_\lambda [\overline{t_3}(\lambda)]^2$$

is in the interval $[K-\epsilon, K+\epsilon]$ for positive constants K and $\epsilon$. In some embodiments, $\epsilon$ is 0.3K, or 0.1K, or some other value at most 0.3K, or some other value. Orthonormal functions are quasi-orthonormal, but the reverse is not always true. If $\epsilon = 0.1K$, the functions will be called 90%-orthonormal. More generally, the functions will be called n%-orthonormal if $\epsilon$ is (100-n)% of K. For example, for 70%-orthonormality, $\epsilon = 0.3K$.

The invention is not limited to the orthonormal or quasi-orthonormal CMF's or to any particular white color representation. For example, in some embodiments, the following color coordinate system $(S_1, S_2, S_3)$ is used for color editing:

$$S_1 = \sqrt{X^2 + Y^2 + Z^2}$$

$$S_2 = X/S_1$$

$$S_3 = Z/S_1 \tag{33}$$

The XYZ tristimulus values in (33) can be replaced with linear RGB tristimulus values or with some other tristimulus values $T_1$, $T_2$, $T_3$, e.g.:

$$S_1 = \sqrt{T_1^2 + T_2^2 + T_3^2}$$

$$S_2 = T_2/S_1$$

$$S_3 = T_3/S_1. \tag{34}$$

If $T_1$ can be negative, than the sign of $T_1$ can be provided in addition to the coordinates. Alternatively the sign of $T_1$ can be incorporated into one of the $S_1$, $S_2$, and/or $S_3$ values, for example:

$$S_1 = \text{Sign}(T_1) \times \sqrt{T_1^2 + T_2^2 + T_3^2} \tag{35}$$

The brightness editing can still be performed by multiplying the $S_1$ coordinate by k, with the $S_2$ and $S_3$ values being unchanged.

The BCH coordinate system can be constructed from linear systems other than DEF, including orthonormal and non-orthonormal, normalized and non-normalized systems. In some embodiments, a coordinate system is used with coordinates $(S_1, S_2, S_3)$, where $S_1$ is defined as in (34) or (35), and the coordinates $S_2$ and $S_3$ are defined in a way similar to (20)-(23), e.g.:

$$S_2 = \cos^{-1}(T_1/B)$$

$$S_3 = \tan^{-1}(T_3/T_2) + \alpha \qquad (36)$$

where $\alpha$ is as in (22), or $$S_3 = arctg(T_2, T_3) \qquad (37)$$

In some embodiments, the value B is the square root of some other quadratic polynomial of in $T_1$, $T_2$, $T_3$:

$$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}$, $g_{22}$, $g_{33}$, $g_{12}$, $g_{13}$, $g_{23}$ are predefined constants, and $g_{11}$, $g_{22}$, $g_{33}$ are not equal to zero (e.g. $g_{11}$, $g_{22}$, $g_{33}$ are positive). Linear transforms result in different mathematical expressions of the coordinates without necessarily changing the values of the coordinates. For example, the coordinate system may use coordinates $S_1$, $S_2$, $S_3$ or their linear transform, wherein $S_1$ is defined by the value B, or $S_1$ is defined by B and the sign of a predefined function of one or more of $T_1$, $T_2$, $T_3$. In some embodiments $$B = \sqrt{\alpha_1^2(T_1, T_2, T_3) + \alpha_2^2(T_1, T_2, T_3) + \alpha_3^2(T_1, T_2, T_3)}$$

wherein $$\alpha_1(T_1, T_2, T_3) = \alpha_{11} \times T_1 + \alpha_{12} \times T_2 + \alpha_{13} \times T_3$$

$$\alpha_2(T_1, T_2, T_3) = \alpha_{21} \times T_1 + \alpha_{22} \times T_2 + \alpha_{23} \times T_3$$

$$\alpha_3(T_1, T_2, T_3) = \alpha_{31} \times T_1 + \alpha_{32} \times T_2 + \alpha_{33} \times T_3$$

wherein $\alpha_{11}$, $\alpha_{12}$, $\alpha_{13}$, $\alpha_{21}$, $\alpha_{22}$, $\alpha_{23}$, $\alpha_{31}$, $\alpha_{32}$, $\alpha_{33}$ are predefined numbers such that the following matrix $\Lambda$ is non-degenerate:

$$\Lambda = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

In some embodiments, the coordinate $S_1$ is defined by the value B and by a sign of a predefined function of one or more of $T_1$, $T_2$, $T_3$. The function can be one of $\alpha_1(T_1,T_2,T_3)$, $\alpha_2(T_1,T_2,T_3)$, $\alpha_3(T_1,T_2,T_3)$. Clearly, the values $T_1'=\alpha_1(T_1,T_2,T_3)$, $T_2'=\alpha_2(T_1,T_2,T_3)$, $T_3'=\alpha_3(T_1,T_2,T_3)$ are also tristimulus values. In some embodiments the coordinate $S_2$ is defined by a value $\beta(T_1,T_2,T_3)/B$, wherein $$\beta(T_1, T_2, T_3) = \beta_1 \times T_1 + \beta_2 \times T_2 + \beta_3 \times T_3,$$

wherein $\beta_1$, $\beta_2$, $\beta_3$ are predefined numbers at least one of which is not equal to zero, or the coordinate $S_2$ is defined by the value $\beta(T_1,T_2,T_3)/B$ and the sign of a predefined function of one or more of $T_1$, $T_2$, $T_3$. The coordinate $S_3$ is defined by a value $\gamma(T_1,T_2,T_3)/B$, wherein $$\gamma(T_1, T_2, T_3) = \gamma_1 \times T_1 + \gamma_2 \times T_2 + \gamma_3 \times T_3,$$

wherein $\gamma_1$, $\gamma_2$, $\gamma_3$ are predefined numbers at least one of which is not equal to zero, and $\gamma(T_1,T_2,T_3)$ is not a multiple of $\beta(T_1,T_2,T_3)$, or the coordinate $S_3$ is defined by the value $\gamma(T_1,T_2,T_3)/B$ and the sign of a predefined function of one or more of $T_1$, $T_2$, $T_3$. In some embodiments, a value $\cos S_2$ is defined by a value $\beta(T_1,T_2,T_3)/B$, wherein $$\beta(T_1, T_2, T_3) = \beta_1 \times T_1 + \beta_2 \times T_2 + \beta_3 \times T_3,$$

wherein $\beta_1$, $\beta_2$, $\beta_3$ are predefined numbers at least one of which is not equal to zero, or the value $\cos S_2$ is defined by the value $\beta(T_1,T_2,T_3)/B$ and the sign of a predefined function of one or more of $T_1$, $T_2$, $T_3$. In some embodiments, a value $\tan S_3$ is defined by a value $\gamma(T_1,T_2,T_3)/\delta(T_1,T_2,T_3)$, wherein $$\gamma(T_1, T_2, T_3) = \gamma_1 \times T_1 + \gamma_2 \times T_2 + \gamma_3 \times T_3,$$

$$\delta(T_1, T_2, T_3) = \delta_1 \times T_1 + \delta_2 \times T_2 + \delta_3 \times T_3,$$

wherein $\gamma_1$, $\gamma_2$, $\gamma_3$ are predefined numbers at least one of which is not equal to zero, and $\delta_1$, $\delta_2$, $\delta_3$ are predefined numbers at least one of which is not equal to zero, or the value $\tan S_3$ is defined by the value $\gamma(T_1,T_2,T_3)/\delta(T_1,T_2,T_3)$ and the sign of a predefined function of one or more of $T_1$, $T_2$, $T_3$. In some embodiments, $\beta(T_1,T_2,T_3)$ is one of $\alpha_1(T_1,T_2,T_3)$, $\alpha_2(T_1,T_2,T_3)$, $\alpha_3(T_1,T_2,T_3)$; $\gamma(T_1,T_2,T_3)$ is another one of $\alpha_1(T_1,T_2,T_3)$, $\alpha_2(T_1,T_2,T_3)$; and $\delta(T_1,T_2,T_3)$ is the third one of $\alpha_1(T_1,T_2,T_3)$, $\alpha_2(T_1,T_2,T_3)$, $\alpha_3(T_1,T_2,T_3)$. In some embodiments, any color whose tristimulus values $T_1,T_2,T_3$ are such that $\alpha_1(T_1,T_2,T_3)$ is not zero and $\alpha_2(T_1,T_2,T_3)=\alpha_3(T_1,T_2,T_3)=0$, is a white or a shade of gray. This can be $D_{65}$ or some other white color. In some embodiments, a monochromatic red color of a predefined wavelength has tristimulus values $T_1$, $T_2$, $T_3$ such that $\alpha_2(T_1,T_2,T_3)$ is positive and $\alpha_3(T_1,T_2,T_3)=0$. In some embodiments, $\alpha_1(T_1,T_2,T_3)$, $\alpha_2(T_1,T_2,T_3)$, $\alpha_3(T_1,T_2,T_3)$ are tristimulus values corresponding to 70%-orthonormal color matching functions. In some embodiments, up to a constant multiple, $\Lambda$ is an orthonormal matrix, i.e. $\Lambda\Lambda^T=I$, where $\Lambda^T$ is a transpose of $\Lambda$, and I is the identity matrix, i.e.

$$I = \begin{bmatrix} 1 & 0 & 0 \\ 0 & 1 & 0 \\ 0 & 0 & 1 \end{bmatrix}$$

We will also call the matrix orthonormal if $\Lambda\Lambda^T=c \times I$ where c is a non-zero number. If the elements of $\Lambda\Lambda^T$ are each within $c \times n/100$ of the respective elements of a matrix $c \times I$ for some c and n, then the matrix $\Lambda$ will be called (100-n)%-orthonormal. For example, if the elements of $\Lambda\Lambda^T$ are each within $0.3 \times c$ of the respective elements of a matrix $c \times I$ (i.e. for each element $\lambda_{i,j}$ of matrix $\Lambda\Lambda^T$, $|\lambda_{i,j}-e_{i,j}| \leq 0.3 \times c$ where $e_{i,j}$ is the corresponding element of the matrix $c \times I$), the matrix $\Lambda$ will be called 70%-orthonormal. In some embodiments, the matrix $\Lambda$ is 70% or more percent orthonormal (e.g. 90%-orthonormal).

The tristimulus values $T_1$, $T_2$, $T_3$, or the corresponding color matching functions, do not have to be normalized in any way. In some prior art systems, the color matching functions are normalized to require that the integral of each color matching function be equal to 1. In the XYZ system of FIG. 2, there is a normalizing condition X=Y=Z for a pre-defined, standard white color with a constant spectral power distribution function $P(\lambda)$. The invention is not limited by any such requirements.

The invention is not limited to the two-dimensional images (as in FIG. 6). The invention is applicable to pixel (bitmap) images and to vector graphics. Colors can be specified separately for each pixel, or a color can be specified for an entire object or some other image portion. The invention is not limited to a particular way to specify the brightness transformation or any other transformations. For example, the brightness transformation can be specified by a value to be added to the brightness (B*=B+k) or in some other way. Other embodiments and variations are within the scope of the invention, as defined by the appended claims.

Appendix 1—Function arctg(a,b)

Here is a pseudocode written in a C-like language (C is a programming language). inline float arctg(const float a, const float b)

```
{
    float res;
    if( FLT_EPSILON * abs(b) < abs(a) )
        //FLT_EPSILON is the minimum positive number ε
        // such that 1-ε is different from 1 on the computer.
        //abs( ) is the absolute value
    {
        res = tan⁻¹ (b / a) ;
        if (a < 0)
        {
            res += π ;
        }
        else if (b < 0)
        {
            res += 2 π ;
        };
    }
    else
    {
        if(b < 0)
        {
            res = 3/2 π ;
        }
        else
        {
            if (b > 0)
            {
                res = ½ π ;
            }
            else
            {
                res = 0 ;
            };
        };
    };
    return res ;
};
```

The invention claimed is:

1. A circuitry-implemented method comprising image editing, the method comprising:
   (1) obtaining digital data for image portions $p_1, p_2, \ldots$, wherein for each image portion p ($p=p_1, p_2, \ldots$), the digital data represent coordinates of a color $S(p)$ of the portion in a first coordinate system, wherein for a color S having tristimulus values $T_1, T_2, T_3$ in a second coordinate system, the coordinates of the color S in the first coordinate system comprise coordinates $S_1, S_2, S_3$, or a linear transformation of the coordinates $S_1, S_2, S_3$, wherein:
   (A) the coordinate $S_1$ is defined by a B value
   $$B = \sqrt{g_{11}T_1^2 + g_{22}T_2^2 + g_{33}T_3^2 + g_{12}T_1T_2 + g_{13}T_1T_3 + g_{23}T_2T_3}$$
   wherein $g_{11}, g_{22}, g_{33}, g_{12}, g_{13}, g_{23}$ are predefined constants, and $g_{11}, g_{22}, g_{33}$ are not equal to zero, or
   (B) the coordinate $S_1$ is defined by the B value and by a sign of a predefined function of one or more of $T_1, T_2, T_3$;
   (2) for each image portion p ($p=p_1, p_2, \ldots$), obtaining color coordinates in the first color coordinate system of a modified color $S^*(p)$ whose coordinates $S_2, S_3$ are predefined constant values independent of the portion p.

2. The method of claim 1 wherein for each image portion p ($p=p_1, p_2, \ldots$), the color $S^*(p)$ has the same coordinate $S_1$ as the color $S(p)$.

3. The method of claim 1 wherein:
   $$B = \sqrt{\alpha_1^2(T_1,T_2,T_3) + \alpha_2^2(T_1,T_2,T_3) + \alpha_3^2(T_1,T_2,T_3)}$$
wherein $$\alpha_1(T_1,T_2,T_3) = \alpha_{11} \times T_1 + \alpha_{12} \times T_2 + \alpha_{13} \times T_3$$

$$\alpha_2(T_1,T_2,T_3) = \alpha_{21} \times T_1 + \alpha_{22} \times T_2 + \alpha_{23} \times T_3$$

$$\alpha_3(T_1,T_2,T_3) = \alpha_{31} \times T_1 + \alpha_{32} \times T_2 + \alpha_{33} \times T_3$$

wherein $\alpha_{11}, \alpha_{12}, \alpha_{13}, \alpha_{21}, \alpha_{22}, \alpha_{23}, \alpha_{31}, \alpha_{32}, \alpha_{33}$ are predefined numbers such that the following matrix $\Lambda$ is non-degenerate:

$$\Lambda = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}.$$

4. The method of claim 3 wherein:
   (C) the coordinate $S_2$ is defined by a value $\beta(T_1,T_2,T_3)/B$, wherein
   $$\beta(T_1,T_2,T_3) = \beta_1 \times T_1 + \beta_2 \times T_2 + \beta_3 \times T_3,$$
   wherein $\beta_1, \beta_2, \beta_3$ are predefined numbers at least one of which is not equal to zero, or
      the coordinate $S_2$ is defined by the value $\beta(T_1,T_2,T_3)/B$ and the sign of said predefined function of one or more of $T_1, T_2, T_3$; and
   (D) the coordinate $S_3$ is defined by a value $\gamma(T_1,T_2,T_3)/B$, wherein
   $$\gamma(T_1,T_2,T_3) = \gamma_1 \times T_1 + \gamma_2 \times T_2 + \gamma_3 \times T_3,$$
   wherein $\gamma_1, \gamma_2, \gamma_3$ are predefined numbers at least one of which is not equal to zero, and $\gamma(T_1,T_2,T_3)$ is not a multiple of $\beta(T_1,T_2,T_3)$, or
      the coordinate $S_3$ is defined by the value $\gamma(T_1,T_2,T_3)/B$ and the sign of said predefined function of one or more of $T_1, T_2, T_3$.

5. The method of claim 4 wherein $\beta(T_1,T_2,T_3)$ is one of $\alpha_1(T_1,T_2,T_3)$, $\alpha_2(T_1,T_2,T_3)$, $\alpha_3(T_1,T_2,T_3)$, and
   $\gamma_2(T_1,T_2,T_3)$ is another one of $\alpha_1(T_1,T_2,T_3)$, $\alpha_2(T_1,T_2,T_3)$, $\alpha_3(T_1,T_2,T_3)$.

6. The method of claim 3 wherein:
   (C) a value $\cos S_2$ is defined by a value $\beta(T_1,T_2,T_3)/B$, wherein
   $$\beta(T_1,T_2,T_3) = \beta_1 \times T_1 + \beta_2 \times T_2 + \beta_3 \times T_3,$$
   wherein $\beta_1, \beta_2, \beta_3$ are predefined numbers at least one of which is not equal to zero, or
      the value $\cos S_2$ is defined by the value $\beta(T_1,T_2,T_3)/B$ and the sign of said predefined function of one or more of $T_1, T_2, T_3$;
   (D) a value $\tan S_3$ is defined by a value $\gamma(T_1,T_2,T_3)/\delta(T_1,T_2,T_3)$, wherein
   $$\gamma(T_1,T_2,T_3) = \gamma_1 \times T_1 + \gamma_2 \times T_2 + \gamma_3 \times T_3,$$
   $$\delta(T_1,T_2,T_3) = \delta_1 \times T_1 + \delta_2 \times T_2 + \delta_3 \times T_3,$$
   wherein $\gamma_1, \gamma_2, \gamma_3$ are predefined numbers at least one of which is not equal to zero, and $\delta_1, \delta_2, \delta_3$ are predefined numbers at least one of which is not equal to zero, or
      the value $\tan S_3$ is defined by the value $\gamma(T_1,T_2,T_3)/\delta(T_1,T_2,T_3)$ and the sign of said predefined function of one or more of $T_1, T_2, T_3$.

7. The method of claim 4 wherein $\beta(T_1,T_2,T_3) = \alpha_1(T_1,T_2,T_3)$;
   $\gamma(T_1,T_2,T_3)$ is one of $\alpha_2(T_1,T_2,T_3)$, $\alpha_3(T_1,T_2,T_3)$; and
   $\delta(T_1,T_2,T_3)$ is the other one of $\alpha_2(T_1,T_2,T_3)$, $\alpha_3(T_1,T_2,T_3)$.

8. The method of claim 7 wherein any color whose tristimulus values $T_1,T_2,T_3$ are such that $\beta(T_1,T_2,T_3)$ is not zero and $\gamma(T_1,T_2,T_3)=\delta(T_1,T_2,T_3)=0$, is a white or a shade of gray.

9. The method of claim 7 wherein a monochromatic red color of a predefined wavelength has tristimulus values $T_1$, $T_2$, $T_3$ such that $\alpha_2(T_1,T_2,T_3)$ is not zero and $\alpha_3(T_1,T_2,T_3)=0$.

10. The method of claim 3 wherein $\alpha_1(T_1,T_2,T_3)$, $\alpha_2(T_1,T_2,T_3)$, $\alpha_3(T_1,T_2,T_3)$ are tristimulus values corresponding to 70%-orthonormal color matching functions.

11. The method of claim 10 wherein $\alpha_1(T_1,T_2,T_3)$, $\alpha_2(T_1,T_2,T_3)$, $\alpha_3(T_1,T_2,T_3)$ are tristimulus values corresponding to 90%-orthonormal color matching functions.

12. The method of claim 10 wherein:

the value $T_1$ is one of values D, E, F, the value $T_2$ is another one of D, E, F, and the value $T_3$ is the third one of D, E, F, where $$\begin{bmatrix} D \\ E \\ F \end{bmatrix} = A \begin{bmatrix} X \\ Y \\ Z \end{bmatrix}$$

where the matrix A has elements which, up to rounding, are as follows:

$$A = \begin{bmatrix} 0.205306 & 0.712507 & 0.467031 \\ -0.365451 & 1.011998 & -0.610425 \\ 1.853667 & -1.279659 & -0.442859 \end{bmatrix}$$

where X, Y, Z are the coordinates of the color S in the CIE 1931 XYZ color coordinate system for a 2° field; wherein up to a constant multiple, $\Lambda$ is a 70%-orthonormal matrix.

13. Circuitry for performing adapted to perform the method of claim 1.

14. One or more computer-readable mediums comprising one or more computer instructions for causing a computer system to perform the method of claim 1.

15. Circuitry for performing the method of claim 2.

16. One or more computer-readable mediums comprising one or more computer instructions for causing a computer system to perform the method of claim 3.

17. Circuitry for performing the method of claim 4.

18. One or more computer-readable mediums comprising one or more computer instructions for causing a computer system to perform the method of claim 5.

19. Circuitry for performing the method of claim 6.

20. One or more computer-readable mediums comprising one or more computer instructions for causing a computer system to perform the method of claim 7.

21. A data transmission method comprising transmitting a computer program over a network link, wherein the computer program is operable to cause a computer system to perform the method of claim 1.

22. A data transmission method comprising transmitting a computer program over a network link, wherein the computer program is operable to cause a computer system to perform the method of claim 2.

* * * * *